UNITED STATES PATENT OFFICE.

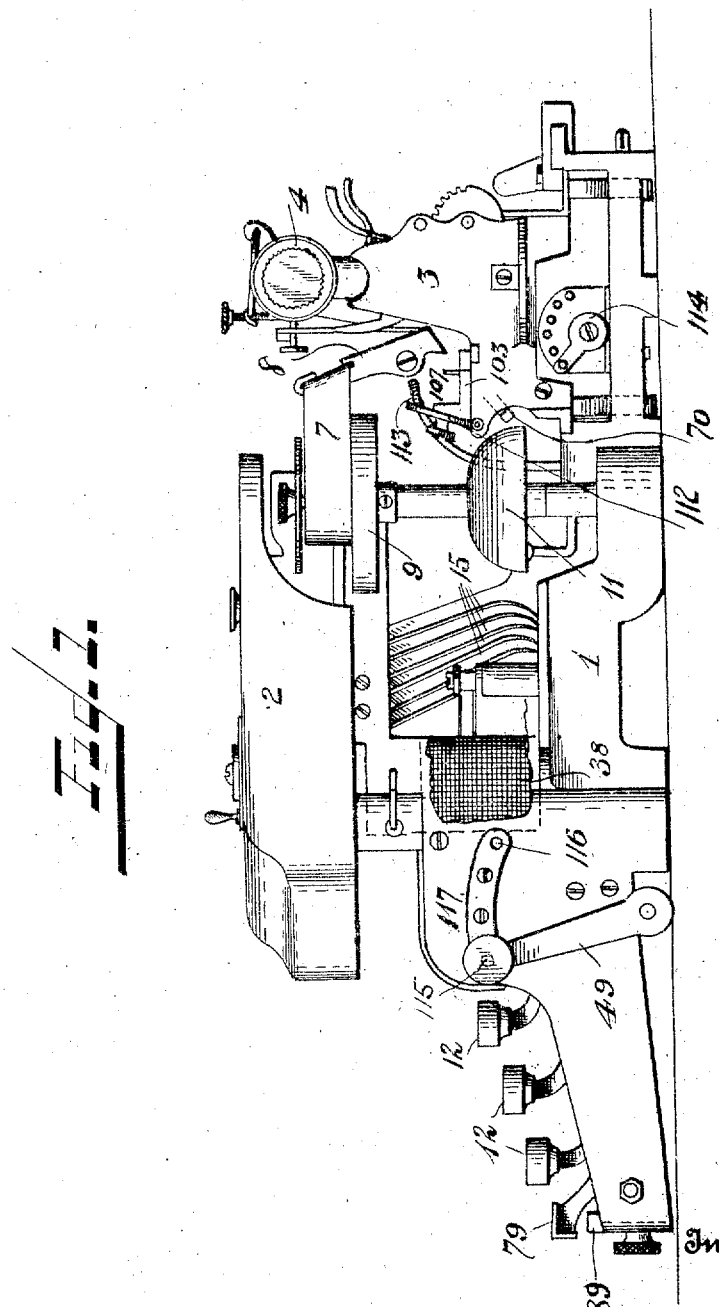

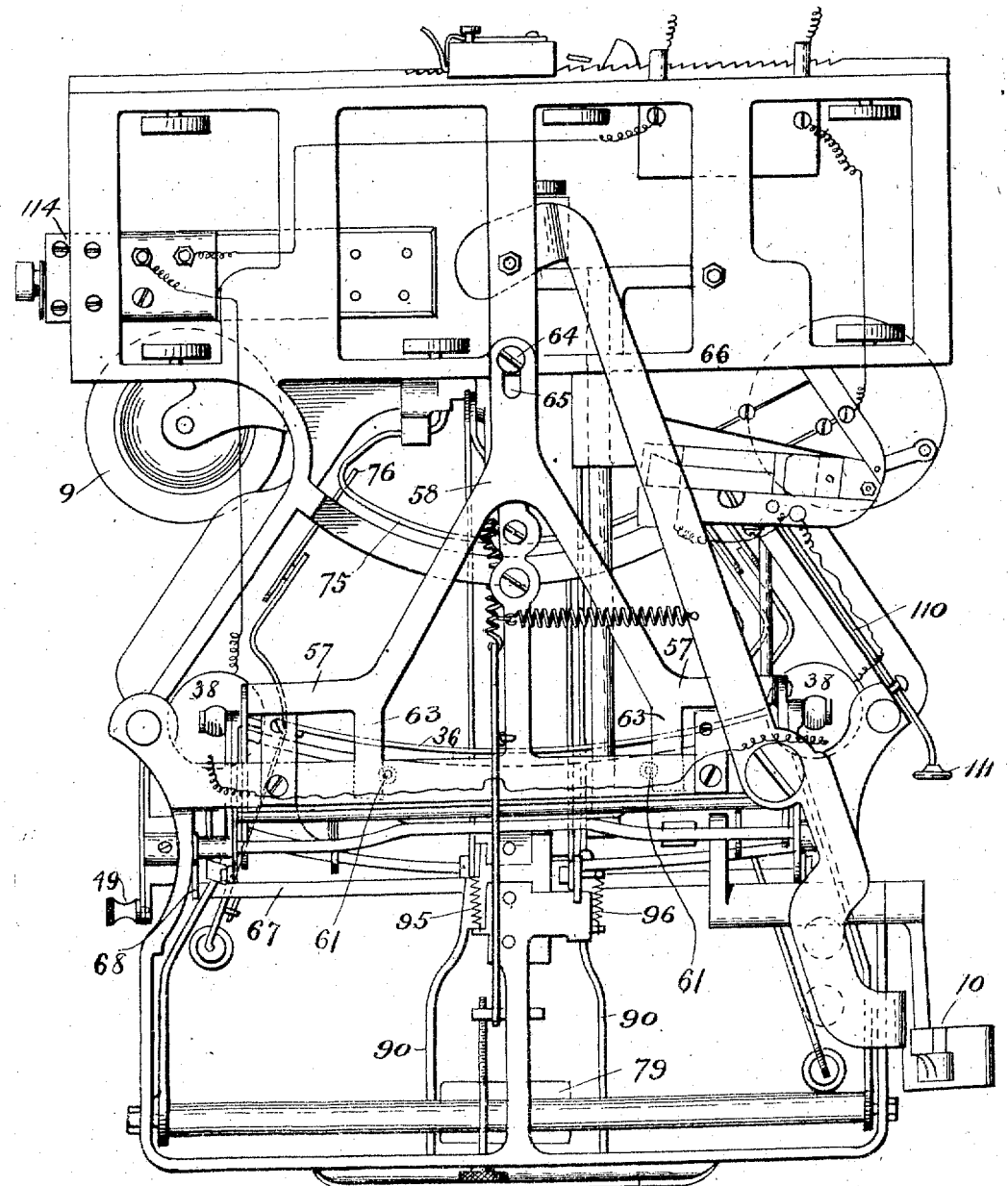

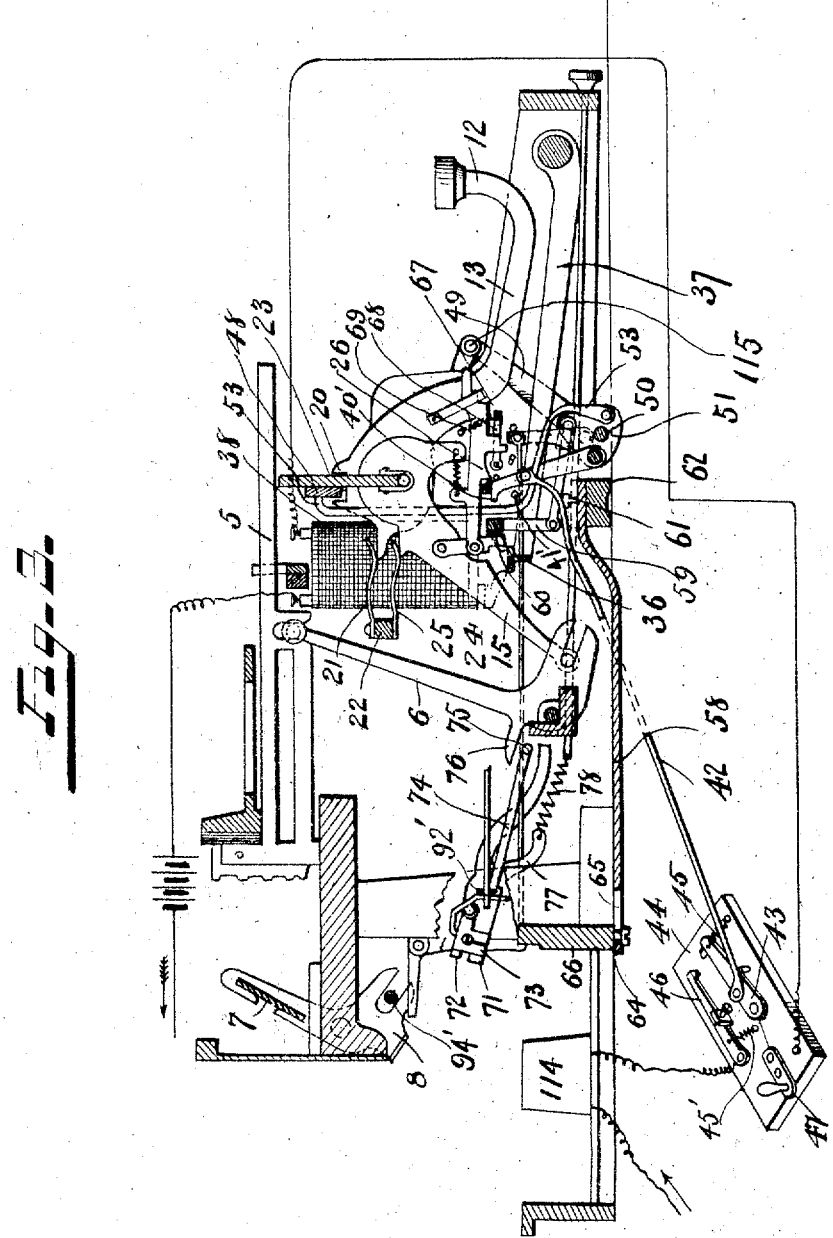

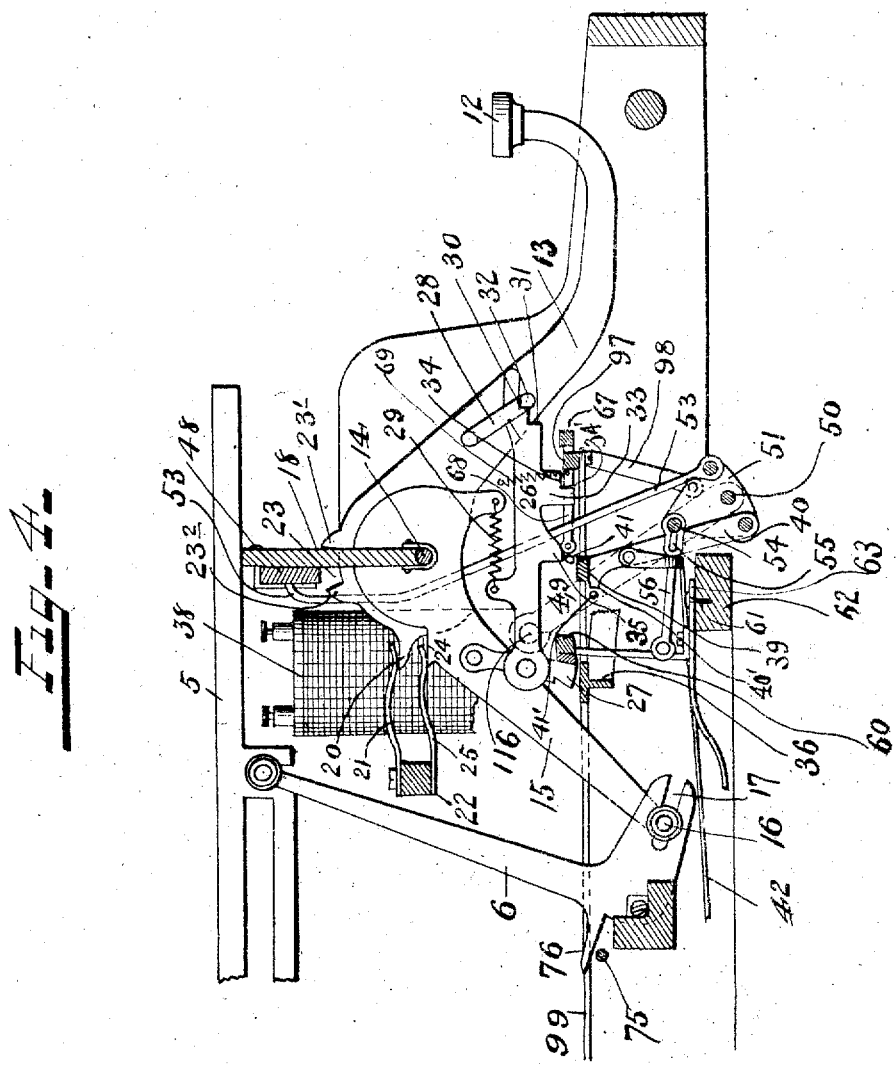

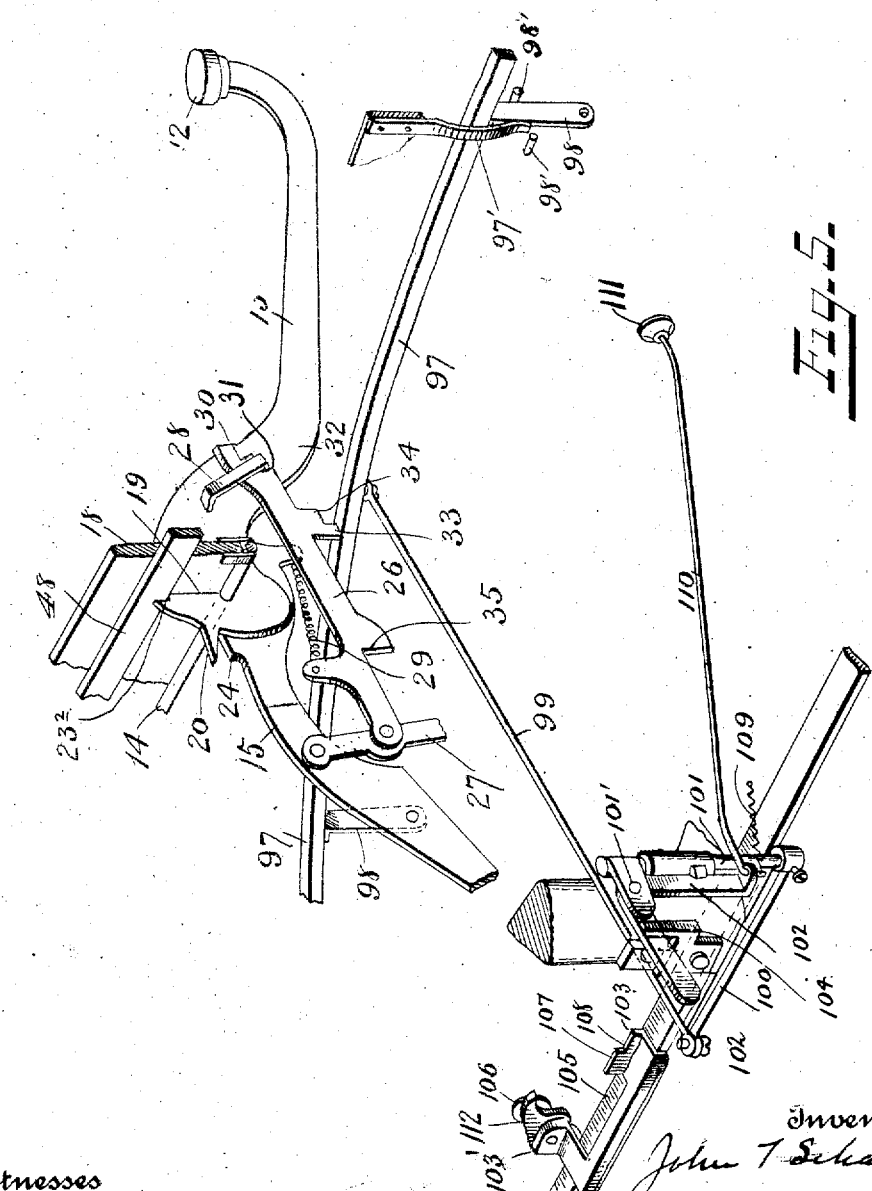

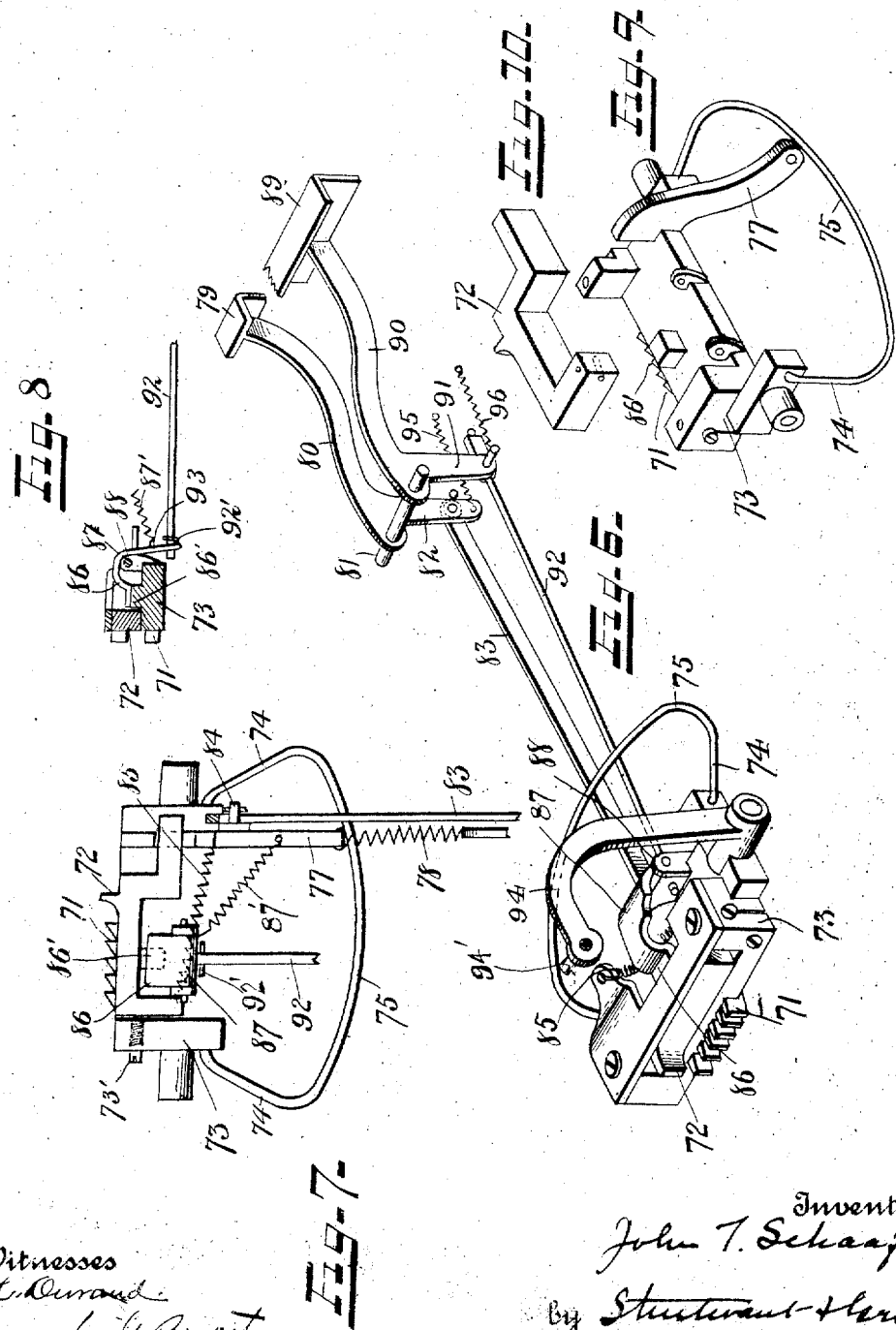

JOHN T. SCHAAFF, OF WASHINGTON, DISTRICT OF COLUMBIA.

TYPE-WRITING AND OTHER KEY-ACTUATED MACHINE.

1,040,585.   Specification of Letters Patent.   Patented Oct. 8, 1912.

Application filed September 20, 1904. Serial No. 225,265.

*To all whom it may concern:*

Be it known that I, JOHN T. SCHAAFF, a citizen of the United States, residing at Washington, in the District of Columbia, have invented certain new and useful Improvements in Type-Writing and other Key-Actuated Machines, of which the following is a description, reference being had to the accompanying drawing and to the letters and figures of reference marked thereon.

My invention relates to typewriting and other key actuated machines in which the typebar or other operated part is arranged to be operated upon the depression of the key, either directly by the key through mechanical connections between the key lever and the typebar, or independently of the movement of the key, by power mechanism set in operation by the depression of the key, and relates particularly to such machines of the class in which the typebar or other operated part is arranged to have a rectilinear or thrust movement in distinction from machines in which the typebar or other operated part is pivoted, though some of the features of the invention are applicable to the latter class of machines as well as to those in which the typebar or other actuated part has the rectilinear or thrust movement.

It is the object of my invention to provide a machine which shall be adapted to be operated either manually, that is directly by the key as in the ordinary typewriting machine, or by power mechanism controlled by the key, and shall be adapted to be set for manual operation or for power operation by the shifting of a single lever.

A further object of my invention is to provide means by which when the carriage has reached a predetermined point in its travel, depression of the key will be ineffective to cause the operated part to be actuated whether the machine is set for manual operation or for power operation.

A further object of the invention is to provide means by which if desired the carriage may be permitted to be fed more than one space upon the depression of a printing key or the space key, so that by a single movement the last letter of a word may be printed and the carriage be permitted to be fed forward a sufficient distance to provide for the word space.

A further object of the invention is to provide a machine capable of operation either manually or electrically which shall be simple and inexpensive in construction and shall involve the least possible changes in or addition to the weight of machines as now constructed.

With these and other objects hereinafter explained in view my invention consists in the construction and combination of elements hereinafter described, and particularly pointed out in the claims.

The invention is herein shown as embodied in a typewriting machine of the kind known in the United States as the Wellington typewriting machine, in which the typebars have a thrust or rectilinear movement but while in some of its details the invention is particularly applicable to such machines, it should be understood that in its main features the invention is applicable to other types of typewriting machines as well as to other machines in which an operated part is operated by or caused to be operated by the depression of a key.

Referring to the drawings, Figure 1 is a side elevation of a typewriting machine embodying my invention. Fig. 2 is a bottom plan view of the same. Fig. 3 is a longitudinal sectional view showing the main operating parts of the machine, the carriage being omitted. Fig. 4 is a longitudinal sectional view showing the key action on an enlarged scale. Fig. 5 is a perspective view showing the key action and line lock on an enlarged scale. Fig. 6 is a perspective view showing the space bars and escapement on an enlarged scale. Fig. 7 is a plan view of the escapement. Fig. 8 is a longitudinal section through a part of the escapement mechanism. Fig. 9 is a perspective view of the frame of the escapement. Fig. 10 is a perspective view of the movable pawl of the escapement.

In the drawings 1 is the frame of the machine and is of the form commonly used in the typewriting machine known as the Wellington typewriter.

2 is the top plate, 3 the carriage and 4 the platen.

5 are the type-bars and 6 the levers which operate them.

7 is the ribbon, 8 the ribbon holder and 9 the ribbon spool.

The type-bars are arranged to slide horizontally and carry the type on their faces. Each of the type-bars preferably carries three type and the platen is arranged to be moved vertically by the shift key 10 to bring the paper in position to receive the impress of any one of the type desired. The means for so shifting the platen and for feeding the carriage forward and for striking the bell 11, as well as the construction of the carriage and the various parts of the mechanism above referred to, form no part of my present invention and need not be described in detail as they are all in common use as parts of the Wellington typewriter as sold on the market.

The finger-keys 12 (Fig. 4) are of usual form and are preferably arranged to form what is generally recognized as the Universal keyboard, though the arrangement of the keys is not material to the invention. Each of the keys is carried by a key-lever 13 which is pivoted at its rear end on a transverse rod 14 suitably supported in the frame of the machine. On the transverse rod 14 is also pivoted the forward end of an auxiliary key-lever 15, the rear end of which carries a pin 16 which engages the slot 17 in the type-bar lever 6. The key-lever and auxiliary lever are held from lateral movement by means of a bar 18 extending across the machine and having slots 19 (Fig. 5) in which the rear end of the key-bars and the forward end of the auxiliary levers are received. The bar 18 is above the ends of the levers and the transverse rod 14 is preferably secured to its lower edge. The key-lever is provided in rear of its pivot with a nose 20 on which bears a spring 21 carried by a bar 22, the spring holding the key 12 normally elevated. The key-lever is also provided above its pivot with a notch or recess 23 the front wall 23' of which, when the key is in normal position, rests against the front face of the bar 18 above the slot 19, forming a stop to limit the upward movement of the key. The rear wall $23^2$ of the notch lies in rear of the bar 18 and is adapted to strike the rear face of the bar when the key is depressed to the limit of the stroke necessary for operating the type-bar manually. The end walls 23' and $23^2$ of the notch 23 thus serve in connection with the bar 18 to limit the movement of the key-lever in both directions.

The auxiliary key-lever 15 has in rear of its pivot a shoulder 24 on which bears a spring 25 carried by the bar 22, the spring acting to press the rear end of the auxiliary key-lever downward and through the action of the pin 16 in the slot 17 holding the type-bar normally in retracted position. Depression of the key 12 will, if the machine is set for electrical operation, take place independently of the movement of the auxiliary key-lever, the necessary movement of the auxiliary key-lever being effected by means of a motor magnet which is caused to be energized by the movement of the key-lever. But when the machine is set for manual operation the key-lever and auxiliary key-lever are so coupled as to operate together. The key-lever extends forward and downward from its pivot while the auxiliary key-lever extends rearward and downward from the same pivot in the form of the letter A, the horizontal bar of the A being formed by the connecting bar which extends between the two levers 13 and 15 below their pivots. The connecting bar 26 is pivoted at its rear end to a link 27 which is pivoted at its upper end to the auxiliary key-lever 15. The forward end of the connecting bar is received in a guide 28 secured to the side of the key-lever 13, the guide being of such length as to permit the end of the connecting bar to be moved vertically. The movement of the link 27 on its pivot is limited in one direction by the contact of the pivot of the rear end of the connecting bar 26 with the under side of the auxiliary key-lever 15. A spring 29 connected at one end to a lug on the upper edge of the connecting bar and at the other end connected to a lug on the auxiliary key-lever forward of its pivot, serves to draw the connecting bar forward and also to force its forward end downward into contact with the pin 32.

On the under side of the connecting bar 26 near its forward end are formed upper and lower shoulders 30 and 31 which are adapted to engage a pin 32 which forms the lower end of the guide 28, the upper shoulder engaging the pin when the machine is to be manually operated and the lower shoulder engaging the pin when the machine is to be electrically operated. When the upper shoulder 30 is engaged with the pin 32, the connecting bar 26 forms a practically rigid connection between the key-lever and auxiliary key-lever so that the depression of the key swinging the key-lever on its pivot swings the auxiliary key-lever on its pivot and through the type-bar lever 6 causes the type-bar to move forward to strike against the platen, the operation being practically the same as in the ordinary Wellington typewriter.

The connecting bar 26 is provided on its lower edge toward its front end with a downwardly extending projection 33 having shoulder 34 formed on its forward edge and is also provided toward its rear end with a downwardly extending projection 35.

The link 27 extends below the pivot of the rear end of the connecting bar 26 and forms a push-finger through which movement may be given to the auxiliary key-lever by a power-operated motor frame. The motor frame comprises a bar 36 extending across the machine and pivotally connected with the frame by means of arms 37 (Fig. 3). The ends of the bar 36 are connected with the armatures of magnets 38 which are preferably located within the frame of the machine. A single magnet might be used to operate the motor frame, but a more satisfactory arrangement is possible if two are used.

When the machine is arranged for electrical operation the lower shoulder 31 rests on the pin 32, the spring 29 drawing the connecting bar 26 forward and swinging the links 27 on their pivots so that their lower ends will when at rest be forward of the bar 36 of the motor frame. On the depression of the key the connecting bar 26 will be moved rearward against the force of spring 29 swinging its link 27 on its pivot so as to bring its lower end directly above the bar 36. The same movement of the key serves to close the circuit of the magnets, by mechanism hereinafter described, causing the bar 36 to lift striking the lower end of the link and causing it to force the lower end of the auxiliary key-lever upward to effect the operation of the type-bar. For closing the circuit a contact frame is provided comprising a bar 39 extending across the machine carried by arms 40 pivoted to movable plates 51 hereinafter described, the bar 39, when the machine is arranged to be operated electrically, being in position to be struck by the rear face of the projection 35 on the lower edge of the connecting bar 26. The forward movement of the contact frame is preferably limited by a stop-pin 41. One of the arms 40 is connected by a link 42 with a movable contact 43 (Fig. 3) pivoted on a plate 44 of non-conducting material preferably arranged on the bars of the machine toward the rear of the machine below one of the ribbon spools. A spring 45 holds the movable contact normally out of contact with the fixed contact 46 which is also carried by the plate 44 and preferably consists of a pivoted bar arranged to yield slightly against the tension of spring 45' when struck by the movable contact. The rear end of one of the arms 40 has an incline or cam 40' formed thereon which as the arms are drawn downward comes against a stop-pin 41' so that as the arms with the contact frame continue their downward movement they will be moved toward the front of the machine drawing the movable contact 43 in a direction away from the fixed contact. As the contact frame is again moved upward the front edge of the arm 40 which inclines toward the rear contacts with pin 41 forcing the arm rearward into its proper position for making contact when a key is depressed. On the plate 44 is also carried a switch 47 for cutting off the current if desired. Depression of the key, the machine being arranged for electrical operation, forcing the connecting bar 26 forward causes the projection 35 to engage the bar 39 moving it forward, and through the link 42, forcing the movable contact 43 against the fixed contact 46 closing the circuit to the motor magnets 38 and causing them to operate the motor frame. As the bar 36 of the motor frame strikes the end of the link 27 raising it and causing the typebar to be operated, as above described, it also raises the connecting bar 26 sufficiently to free the projection 35 from engagement with the bar 39 of the contact frame, thus permitting the circuit to be broken by the action of the spring 45 on the movable contact 43. The movement of the key necessary to position the link 27 and close the circuit, is only a fraction of the movement movement of the key-lever when the mabar. It is desirable, therefore, to limit the movement of the key-lever when the machine is to be used electrically. This is done in the present machine by means of a stop-bar 48 arranged to be movable vertically on the inner face of the bar 18 into or out of the notch 23 and into or out of the path of movement of the end wall $23^2$ so that when moved downward into the notch the depression of the key-lever will be stopped by the contact of the rear wall $23^2$ of the notch with the rear face of the stop-bar 48.

For the purpose of converting the machine from an electrically operated to a manually operated machine, or vice versa, it is necessary to change the position of the cantact frame, the links 27 and the movable stop 48 and to so shift the movable contact that the circuit in the one case may be closed by movement of the contact frame and in the other case cannot be closed. All of these movements in the present machine are effected by means of a single lever 49 arranged at the side of the machine convenient to the hand of the operator. The lever 49 is secured outside the frame on the end of a rod 50 journaled in the base of the machine. On the rod 50 near its ends but within the frame of the machine are secured triangular plates 51, so arranged that when the machine is set for electrical operation the base of the triangle is about parallel with the base of the machine or inclined downward toward the front of the machine. The rod 50 passes through the plates 51 at points near and about midway of their bases. To the triangular plates near their bases and forward of the rod 50 are pivoted rods 53 to the upper ends of which are secured the stop bar 48, the rods 53 being suitably bent to avoid conflict with any of the working parts of the machine. To the rear of the rod 50 the arms 40 are pivoted to the triangular plates near their bases. The triangular plates are provided above the rod 50 with pins 54 which enter slots 55 in links 56, which extend rearward and are pivoted to side extensions 57 of a Y frame 58 which carries by means of arms 59 a positioning bar 60 extending across the machine arranged when in its forward position to limit the forward movement of the lower ends of the links 27 caused by the action of the springs 29 and when moved rearward to push against the links 27 near their lower ends and to force them rearward against the force of the springs 29 thus drawing the connecting bars 26 rearward until their shoulders 30 are in position to be engaged by the pins 32 of the key-levers. The Y-frame is guided in its reciprocation by pins 61 in the cross-bar 62 of the machine frame against which parallel portions 63 of the forward ends of the Y rest, and by a screw 64 which passes through a slot 65 in the rearward end of the Y and enters the crossbar 66 of the machine frame. The parallel movement of the ends of the positioning bar and the other parts moved by the rod 50 through the triangular plates 51 is thus insured. As the lever 49 is drawn toward the front of the machine, the rocking of the triangular plates will through the rods 53 move the stop-bar 48 downward into the notch 23 in the key-lever, and through the arms 40 will raise the bar 39 of the contact frame. The contact frame in its upward movement strikes the projections 35 on the connecting bar 26 raising its forward end till its shoulder 30 is out of engagement with the pin 32 permitting it to be drawn forward by the spring 29 so that the projections 35 are brought forward of the bar 39 and the forward end of the connecting bar drops with its shoulder 31 in position to be engaged by the pin 32. The same movement of the triangular plates draws the pins 54 forward until they strike the forward ends of the slots in the links 56 when their further movement will draw the Y-frame forward, carrying the position bar 60 forward permitting the lower ends of the links 27 to swing forward out of line with the bar 36 of the motor frame. The movement given to the contact-frame carries the incline or nose 40' above the pin 41' permitting the pin 41 to act on the front edge of arm 40 to move the contact-frame forward at the same time moving the contact 43 forward into position to be movable into contact with the fixed contact on the depression of a key. The machine is then ready to be operated electrically. Movement of the lever 49 in a forward direction will raise the stop-bar 48, lower the contact-frame out of position to be struck by the projections 35, bringing the nose 40' in contact with pin 41', forcing the frame rearward and drawing the movable contact 43 away from its normal position of rest and rendering it impossible to make electric contact, and will move the position-bar 60 forward against the lower ends of the links 27 swinging them forward and drawing the connecting bars forward until their shoulders 30 drop into position to be engaged by the pins 32. The machine is then ready to be operated manually.

It will be understood from the above description that when the machine is set for electrical operation the movement of the type-bar is independent of the movement of the key, the depression of the key serving to position the link 27 and close the circuit, the movement of the motor-frame serving not only to operate the key but also to raise the connecting bar 26 sufficiently to release the contact frame and to release the shoulder 31 from engagement with the pin 32 so that the typebar and the auxiliary lever may return to normal position independent of the release of the key.

In order to provide for return of the typebar independent of the release of the key when the machine is set for manual operation, a releasing frame comprising a bar 67 extending across the machine, carried by arms 68 pivoted to the frame, is provided, the bar 67 being arranged below the forward portion of the connecting bar 26 and being supported by a spring 69. In operation as the key nears the limit of its downward movement it brings the connecting bar 26 against the bar 67, which yields, putting the spring 69 under tension, the spring not being strong enough to raise the connecting bar so long as it is being forced rearward by the key lever. But by reason of the impetus given the key in rapid operation of the machine, which is transmitted to the auxiliary key lever and the typebar, the typebar and the auxiliary key lever will continue their rearward movement after the key-lever has been stopped by the contact of the end 23ª of the notch 23 with the rear face of the bar 18, thus for an instant relieving the pressure of the pin 32 of the key lever against the shoulder 30 of the contact bar and leaving the contact bar free to be swung upward by release bar 67 through the action of the spring 69 thus disengaging the shoulder 30 from the pin 32, thus leaving the typebar and auxiliary key lever free to return to normal position independent of the return of the key. On the release of the key it is raised by the spring 21 into normal position, and in rising the pin 32 is again brought into engagement with the shoulder 30.

The carriage 3 is provided with the usual rack-bar 70 (Fig. 1) with which the pawls 71 and 72 of the escapement engage. The escapement pawls are mounted in a frame 73 pivoted in the frame of the machine and arranged to rock on a horizontal axis. Extending forward from the frame 73 is a rod 74 having a curved portion 75 in position to be struck by a rearwardly extending lug 76 on the type-bar lever 6. The frame 73 also has a forwardly extending arm 77 to which a spring 78 is connected for restoring the frame to position after it has been operated to release the carriage.

79 is the space key preferably arranged in the center of the key-board on the level of the forward bank of keys 12. The lever 80 which carries the space key is pivoted on a rod 81 carried by the frame and has a downward extension 82 which is connected by a link 83 with a pin 84 on the frame 73 below its pivot. The end of the link 83 is slotted to receive the pin 84 so that the frame 73 is free to be rocked by the movement of the type-bar levers 6 without moving the space key.

The lower pawl 71 is stationary on the frame 73 and preferably consists of a plurality of teeth adapted to mesh with the teeth of the rack bar 70. The upper pawl 72 is arranged to be movable in the frame 73 in a direction transverse of the machine and has a single tooth for engaging the rack bar. A spring 85 tends to draw the pawl 72 to the right, that is in the direction opposite to that in which the carriage is fed during the operation of the machine. The pawl 72 is normally held by the spring 85 against the movable stop 86' with the tooth of the pawl approximately in line with the right hand tooth of the pawl 71. Sufficient space is left between the left hand end of the pawl 72 and the left hand end of the recess of the frame 73 in which the pawl is carried to permit the tooth of the pawl to move against the force of the spring 85 a sufficient distance to bring it in line with the second tooth of the pawl 71.

So far as thus described the action of the escapement mechanism is substantially the same as in the ordinary Wellington typewriter. The construction, however, is somewhat different. In the present construction the pawl 72 instead of being stopped in its movement to the right under the influence of the spring 85 with its tooth in line with the right hand tooth of the pawl 71 by contact with the fixed stop 86', is so stopped by contact with a movable stop 86 carried by an arm 87 pivoted at 88 on the frame 73 and adapted to be raised out of the path of the pawl 72 against the tension of spring 87' by means of an auxiliary space-key 89 which is arranged in front of and below the lower bank of keys. This key 89 is carried by key-lever 90 pivoted on rod 81 and has downward projection 91 to which is pivoted a rearwardly extending rod 92 having a stop-pin 92' which is adapted to push against the depending finger 93 (Fig. 8) of the arm 87. Depression of the auxiliary space key thus raises the stop 86 permitting the spring 85 to draw the pawl 72 to the right till its tooth is one space beyond the right hand tooth of the pawl 71 in which position the pawl is stopped by the fixed stop 86' on the frame 73. When the machine is at rest the tooth of the pawl 72 is in engagement with the rack bar 70 the tension of the carriage feed spring holding the pawl with its left hand end against an adjustable stop screw 73' in the left hand end of the frame 73, in which the pawl is carried. On the operation of a type-bar lever either manually or electrically, or the space key, the frame 73 is rocked to bring the teeth of pawl 71 into engagement with the teeth of the rack and on the release of the type-bar lever or the space key, as the case may be, the tooth of the pawl 72, which in the meantime has been drawn to the right by the spring 85, is again brought into engagement with a tooth of the rack bar and yielding to the force of the carriage feed spring permits the carriage to move forward until the left hand end of the pawl strikes the end of the screw 73'. If the auxiliary space key is depressed simultaneously with or in advance of the depression of the space key or simultaneously with or in advance of the depression of one of the keys 12, the movable stop 86 will be lifted and the pawl 72 will be drawn to the right by the spring 85 the equivalent of two spaces so that when the frame 73 is returned to its position of rest the pawl 72 in yielding until it comes to rest against screw 73' will permit the carriage to move two spaces.

The frame 73 carries an upwardly extending arm 94 having pin 94' for rocking the ribbon holder 8. Springs 95, 96, connected respectively to the extensions 82 and 91 serve to hold the space key and auxiliary space key normally in elevated position.

It is desirable in typewriting machines to provide some mechanism to prevent the operation of the type-bars after the carriage has reached a predetermined point in its forward movement. Such a device is provided in the present invention and is arranged to operate to prevent movement of the type-bars after the carriage has reached the predetermined point in its movement, both when the machine is set for electrical operation and when set for manual operation. The essential part of this line lock mechanism is a transverse stop bar 97 carried by arms 98 pivoted to the frame and arranged to be swung forward at the predetermined point in the travel of the carriage into the path of movement of the projection 33 on the lower edge of the connecting bar 26, or the shoulder 34 on this projection according as the machine is set for operation electrically or manually, so that on the depression of a key after the stop bar has been swung forward, the connecting bar 26 being held against downward movement, pin 32 carried down out of engagement with the shoulder 31 or 30 without effecting any appreciable movement of the connecting bar and consequently without causing any movement of the type-bar. The stop-bar 97 is held normally in its forward position out of the path of the projection 33 or shoulder 34 by a spring 97' bearing against one of the arms 98 the movement of the stop-bar in either direction being limited by stop pins 98' arranged in the path of movement of one of the arms 98. For the purpose of so swinging the stop bar forward it is connected by a link 99 with an arm 100 secured to a vertical rock shaft 101 mounted on the frame of the machine. Near its upper end the rock shaft 101 is provided with an arm 102 which extends rearward in the path of an adjustable stop 103 carried by the carriage.

104 is a fixed stop secured to the frame against which the arm 102 strikes when forced over by the stop 103.

The stop 103 comprises a plate adapted to rest on the gage bar 105 having at its right hand end a clamp screw 106 and at its forward end having an upturned flange 107 having a shoulder 108 formed thereon. The arm 102 is pivoted to the rock shaft 101 at 101' and is L-shaped, its horizontal member extending into the path of the stop 103 and its vertical portion extending downward along the rock shaft 101. A spring 109 is secured to the lower end of the vertical member of the arm 102 holding its horizontal portion depressed into the path of the end of the stop 103. A rod 110 is connected to the lower end of the vertical member of the arm 102 extending forward to a convenient part of the machine and is provided at its forward end with a push button 111. On the lug 103' is pivoted the trip 112 for the bell striker 113.

In the operation of the machine as the carriage reaches the predetermined point of its travel the end of the stop 103 strikes the arm 102 and pushing it over rocks the rock shaft 101 and through the arm 100 and link 99 swings the stop bar forward into position to prevent the downward movement of the connecting bar 26 and thus preventing the further operation of the type-bar by the depression of the keys. If it is desired to continue the writing further, as for the completing of a word, the push button 111 is pushed which through the rod 110 acts upon the vertical member of the arm 102 to raise the horizontal member sufficiently to free it from the end of the stop 103. The machine may then be operated until the shoulder 108 comes against the arm 102 pushing it over and finally bringing the carriage to a stop and also again swinging the stop bar over into position to prevent downward movement of the connecting bar.

For the purpose of regulating the force of the blow given to the links 27 through the motor frame a rheostat 114 is arranged in the circuit. This may conveniently be arranged beneath the carriage at the right of the machine.

For the purpose of holding the shifting lever 49 in its two positions it is made slightly elastic and is provided at its upper end with a pin 115 adapted to enter holes 116 at the opposite ends of an arc shaped guide piece 117 secured to the side of the machine.

It will of course be understood that while the invention is herein described as applied to a typewriting machine of the thrust bar type I do not desire to be limited to its application to this particular type of typewriting machines nor do I desire to be limited to its application to or use in connection with typewriting machines as its broad features and many of its specific features are obviously applicable not only to typewriting machines of types other than the thrust bar type, but also to linotype machines, matrix-making machines and other machines in which an operating part is actuated by or through the movement of a finger key. It is also obvious that many changes in the form and arrangement of the parts may be made without departing from the spirit of the invention and I therefore do not desire to be limited to the precise construction and arrangement shown and described.

I claim :—

1. In a key-controlled machine, the combination of an operated part and a key, power mechanism adapted, when actuated, to actuate the operated part independently of the key, and mechanism intermediate the operated part and key adapted, when in one position to serve to actuate the power mechanism on the depression of the key, and, when in another position, to prevent the actuation of the power mechanism and to transmit the movement of the key directly to the operated part, and a single lever adapted by its movement to shift said intermediate mechanism from one position to the other at will.

2. In a typewriting machine, the combination of a typebar and a key, power mechanism adapted, when actuated, to actuate the typebar independently of the key, and mechanism intermediate the typebar and key adapted, when in one position to serve to actuate the power mechanism on the depression of the key, and, when in another position, to prevent the actuation of the power mechanism and to transmit the movement of the key directly to the typebar, and a single lever adapted by its movement to shift said intermediate mechanism from one position to the other at will.

3. In a key-controlled mechanism, the combination of an operated part and a key, a normally inactive motor adapted, when actuated, to actuate the operated part independently of the key, and mechanism intermediate the operated part and key adapted, when in one position, to serve to actuate the motor on the depression of the key, and, when in another position, to prevent the actuation of the power mechanism and to serve to transmit the movement of the key directly to the operated part, and a single lever adapted by its movement to shift said intermediate mechanism from one position to the other at will.

4. In a typewriting machine, the combination of a typebar and a key, a normally inactive motor adapted, when actuated, to actuate the typebar independently of the key, and mechanism intermediate the typebar and key adapted, when in one position, to serve to actuate the motor on the depression of a key, and when in another position, to prevent the actuation of the power mechanism and to serve to transmit the movement of the key directly to the typebar, and a single lever adapted by its movement to shift said intermediate mechanism from one position to the other.

5. In a key-controlled mechanism, the combination of an operated part, a key lever, an auxiliary lever, and means connecting the auxiliary lever with the operated part, of power mechanism adapted, when actuated, to operate the auxiliary lever, means for controlling the power mechanism, a connecting bar having engagement with the key lever and adapted, when in one position, to operate the controlling means on the depression of the key and when in another position, to serve as a mechanical connection between the key lever and the auxiliary lever, and means for shifting the connecting bar from one position to the other.

6. In a typewriting machine, the combination of a typebar, a key lever, an auxiliary lever, and means connecting the auxiliary lever with the typebar, of power mechanism adapted, when actuated, to operate the auxiliary lever, means for controlling the power mechanism, a connecting bar having engagement with the key lever and adapted, when in one position, to operate the controlling means on the depression of the key and when in another position, to serve as a mechanical connection between the key lever and the auxiliary lever, and means for shifting the connecting bar from one position to the other.

7. In a key-controlled mechanism, the combination of an operated part, a key lever, an auxiliary lever, and means connecting the auxiliary lever with the operated part, of a normally inactive motor adapted, when actuated, to operate the auxiliary lever, means for actuating the motor, a connecting bar having engagement with the key lever and adapted, when in one position, to operate the motor actuating means on the depression of the key, and when in another position, to serve as a mechanical connection between the key lever and the auxiliary lever, and means for shifting the connecting bar from one position to the other.

8. In a typewriting machine, the combination of a typebar, a key lever, an auxiliary lever, and means connecting the auxiliary lever with the typebar, of power mechanism adapted, when actuated, to operate the auxiliary lever, means for controlling the power mechanism, a connecting bar having engagement with the key lever and adapted, when in one position, to move independently of the auxiliary lever, to operate the controlling means on the depression of the key and, when in another position, to serve as a mechanical connection between the key lever and the auxiliary lever, and means for shifting the connecting bar from one position to the other.

9. In a typewriting machine, the combination of a typebar, a key lever, an auxiliary lever, and means connecting the auxiliary lever with the typebar, of a normally inactive motor adapted, when actuated, to operate the auxiliary lever, means for actuating the motor, a connecting bar having engagement with the key lever and adapted, when in one position, to move independently of the auxiliary lever to operate the motor actuating means on the depression of the key and, when in another position, to serve as a mechanical connection between the key lever and the auxiliary lever, and means for shifting the connecting bar from one position to the other.

10. In a typewriting machine, the combination of a typebar, a key lever, an auxiliary lever, and means connecting the auxiliary lever with the typebar, of a motor magnet arranged in a normally open circuit adapted, when actuated, to operate the auxiliary lever, means for closing the motor circuit, a connecting bar having engagement with the key lever and adapted, when in one position, to move independently of the auxiliary lever to operate the circuit closing means on the depression of the key and, when in another position, to serve as a mechanical connection between the key lever and the auxiliary lever, and means for shifting the connecting bar from one position to the other.

11. In a typewriting machine, the combination of a typebar, a key lever, an auxiliary lever, and means connecting the auxiliary lever with the typebar, of power mechanism adapted, when actuated, to operate the auxiliary lever, means for controlling the power mechanism movable into and out of operative position, a connecting bar having engagement with the key lever and adapted, when in one position, to operate the controlling means on the depression of the key and, when in another position, to serve as a mechanical connection between the key lever and the auxiliary lever, and means for moving the controlling means into and out of operative position and shifting the connecting bar from one position to the other.

12. In a typewriting machine, the combination of a typebar, a key lever, an auxiliary lever, and means connecting the auxiliary lever with the typebar, a normally inactive motor adapted, when actuated, to operate the auxiliary lever, means for actuating the motor movable into and out of operative position, a connecting bar having engagement with the key lever and adapted, when in one position, to operate the motor actuating means on the depression of the key and, when in another position, to serve as a mechanical connection between the key lever and the auxiliary lever, and means for moving the controlling means into and out of operative position and shifting the connecting bar from one position to the other.

13. In a typewriting machine, the combination of a typebar, a key lever, an auxiliary lever, and means connecting the auxiliary lever with the typebar, of a motor magnet arranged in a normally open circuit adapted, when actuated, to operate the auxiliary lever, means for closing the motor circuit movable into and out of operative position, a connecting bar having engagement with the key lever and adapted, when in one position, to operate the circuit closing means on the depression of the key and, when in another position, to serve as a mechanical connection between the key lever and the auxiliary lever, and means for moving the controlling means into and out of operative position and shifting the connecting bar from one position to the other.

14. In a key-operated mechanism, the combination of a key lever, an operated part, an auxiliary lever, and means connecting the auxiliary lever with the operated part, a connecting bar connected at its rear end with the auxiliary lever and having its forward end provided with two shoulders one in advance of the other, a spring connected to the connecting bar for drawing it forward, power mechanism arranged, when actuated, to actuate the auxiliary lever, controlling means for the power mechanism comprising a contact frame movable into and out of the path of movement of the connecting bar, positioning means for holding the connecting bar in rearward position and means operated by a single lever for simultaneously withdrawing the positioning means to permit the connecting bar to be drawn forward, raising the forward end of the connecting bar to free its forward shoulder from engagement with the pin on the key lever, and moving the contact frame into position to be operated by the connecting bar.

15. In a typewriting machine, the combination of a key lever, a typebar, an auxiliary lever, and means connecting the auxiliary lever with the typebar, a connecting bar connected at its rear end with the auxiliary lever and having its forward end provided with two shoulders one in advance of the other, a spring connected to the connecting bar for drawing it forward, power mechanism arranged, when actuated, to actuate the auxiliary lever, controlling means for the power mechanism comprising a contact frame movable into and out of the path of movement of the connecting bar, positioning means for holding the connecting bar in rearward position and means operated by a single lever for simultaneously withdrawing the positioning means to permit the connecting bar to be drawn forward, raising the forward end of the connecting bar to free its forward shoulder from engagement with the pin on the key lever, and moving the contact frame into position to be operated by the connecting bar.

16. In a key-controlled mechanism, the combination of a key lever, an operated part, an auxiliary lever, and means connecting the auxiliary lever with the typebar, a connecting bar having its forward end provided with two shoulders one in advance of the other, a connection between the rear end of the connecting bar and the auxiliary lever arranged to permit independent movement of the connecting bar and auxiliary lever, a spring connected to the connecting bar for drawing it forward, a motor magnet arranged in a normally open circuit and arranged, when actuated, to actuate the auxiliary lever, means for closing the motor circuit comprising a contact frame movable into and out of the path of movement of the connecting bar, positioning means for holding the connecting bar in rearward position and means operated by a single lever for simultaneously withdrawing the positioning means to permit the connecting bar to be drawn forward, raising the forward end of the connecting bar to free its forward shoulder from engagement with the pin on the key lever, and moving the contact frame into position to be operated by the connecting bar.

17. In a typewriting machine, the combination of a key lever, a typebar, an auxiliary lever, and means connecting the auxiliary lever with the typebar, a connecting bar having its forward end provided with two shoulders one in advance of the other, a connection between the rear end of the connecting bar and the auxiliary lever arranged to permit independent movement of the connecting bar and auxiliary lever, a spring connected to the connecting bar for drawing it forward, a motor arranged in a normally open circuit and arranged, when actuated, to actuate the auxiliary lever, means for closing the motor circuit comprising a contact frame movable into and out of the path of movement of the connecting bar, positioning means for holding the connecting bar in rearward position and means operated by a single lever for simultaneously withdrawing the positioning means to permit the connecting bar to be drawn forward, raising the forward end of the connecting bar to free its forward shoulder from engagement with the pin on the key lever, and moving the contact frame into position to be operated by the connecting bar.

18. In a key-controlled mechanism, the combination of a key lever, an operated part, an auxiliary lever, and means connecting the auxiliary lever with the operated part, a connecting bar having its forward end provided with two shoulders one in advance of the other, a connection between the rear end of the connecting bar and the auxiliary lever arranged to permit independent movement of the connecting bar and auxiliary lever, a spring connected to the connecting bar for drawing it forward, power mechanism arranged, when actuated, to actuate the auxiliary lever, controlling means for the power mechanism comprising a contact frame movable into and out of the path of movement of the connecting bar, positioning means for holding the connecting bar in rearward position and means operated by a single lever for simultaneously withdrawing the positioning means to permit the connecting bar to be drawn forward, raising the forward end of the connecting bar to free its forward shoulder from engagement with the pin on the key lever, and moving the contact frame into position to be operated by the connecting bar.

19. In a typewriting machine, the combination of a key lever, a typebar, an auxiliary lever, and means connecting the auxiliary lever with the typebar, a connecting bar having its forward end provided with two shoulders one in advance of the other, a connection between the rear end of the connecting bar and the auxiliary lever arranged to permit independent movement of the connecting bar and auxiliary lever, a spring connected to the connecting bar for drawing it forward, power mechanism arranged, when actuated, to actuate the auxiliary lever, controlling means for the power mechanism comprising a contact frame movable into and out of the path of movement of the connecting bar, positioning means for holding the connecting bar in rearward position and means operated by a single lever for simultaneously withdrawing the positioning means to permit the connecting bar to be drawn forward, raising the forward end of the connecting bar to free its forward shoulder from engagement with the pin on the key lever, and moving the contact frame into position to be operated by the connecting bar.

20. In a key-controlled mechanism, the combination of a key lever, an operated part, an auxiliary lever and means connecting the auxiliary lever with the operated part, a connecting bar connected at its rear end with the auxiliary lever and having its forward end provided with two shoulders one in advance of the other, a pin on the key lever in position to engage either of said shoulders, a spring connected with the connecting bar for drawing it forward, power mechanism arranged, when actuated, to actuate the auxiliary lever, controlling means for the power mechanism, comprising a contact frame movable into and out of the path of movement of the connecting bar, positioning means for holding the connecting bar in rearward position, and means actuated by a single lever for simultaneously moving the contact frame out of the path of the connecting bar and operating the positioning means to free the connecting bar rearward to bring its forward shoulder into position to be engaged by the pin on the key lever.

21. In a typewriting machine, the combination of a key lever, a typebar, and an auxiliary lever and means connecting the auxiliary lever with the typebar, a connecting bar connected at its rear end with the auxiliary lever and having its forward end provided with two shoulders one in advance of the other, a pin on the key lever in position to engage either of said shoulders, a spring connected with the connecting bar for drawing it forward, power mechanism arranged, when actuated, to actuate the auxiliary lever, controlling means for the power mechanism, comprising a contact frame movable into and out of the path of movement of the connecting bar, positioning means for holding the connecting bar in rearward position, and means actuated by a single lever for simultaneously moving the contact frame out of the path of the connecting bar and operating the positioning means to force the connecting bar rearward to bring its forward shoulder into position to be engaged by the pin on the key lever.

22. In a key-controlled mechanism, the combination of a key lever, an operated part, and an auxiliary lever and means connecting the auxiliary lever with the operated part, a connecting bar connected at its rear end with the auxiliary lever and having its forward end provided with two shoulders one in advance of the other, a pin on the key lever in position to engage either of said shoulders, a spring connected with the connecting bar for drawing it forward, a motor magnet arranged in a normally open circuit and arranged, when actuated, to actuate the auxiliary lever, means for closing the motor circuit, comprising a contact frame movable into and out of the path of movement of the connecting bar, positioning means for holding the connecting bar in rearward position, and means actuated by a single lever for simultaneously moving the contact frame out of the path of the connecting bar and operating the positioning means to force the connecting bar rearward to bring its forward shoulder into position to be engaged by the pin on the key lever.

23. In a typewriting machine, the combination of a key lever, a typebar, and an auxiliary lever and means connecting the auxiliary lever with the typebar, a connecting bar connected at its rear end with the auxiliary lever and having its forward end provided with two shoulders one in advance of the other, a pin on the key lever in position to engage either of said shoulders, a spring connected with the connecting bar for drawing it forward, a motor magnet arranged in a normally open circuit and arranged, when actuated, to actuate the auxiliary lever, means for closing the motor circuit comprising a contact frame movable into and out of the path of movement of the connecting bar, positioning means for holding the connecting bar in rearward position, and means actuated by a single lever for simultaneously moving the contact frame out of the path of the connecting bar and operating the positioning means to free the connecting bar rearward to bring its forward shoulder into position to be engaged by the pin on the key lever.

24. In a typewriting machine, the combination of a key lever, a typebar, and an auxiliary lever and means connecting the auxiliary lever with the typebar, a connecting bar connected at its rear end with the auxiliary lever and having its forward end provided with two shoulders one in advance of the other, a pin on the key lever in position to engage either of said shoulders, a spring connected with the connecting bar for drawing it forward, a motor magnet arranged in a normally open circuit and arranged, when actuated, to actuate the auxiliary lever, circuit closing means for closing the motor circuit comprising a contact frame movable into and out of the path of movement of the connecting bar, positioning means for holding the connecting bar in rearward position, a means actuated by a single lever for simultaneously moving the contact frame out of the path of the connecting bar and operating the positioning means to force the connecting bar rearward to bring its forward shoulder into position to be engaged by the pin on the key lever.

25. In a key-controlled mechanism, the combination of a key lever, an operated part, and an auxiliary lever and means connecting the auxiliary lever with the operated part, a connecting bar connected at its rear end with the auxiliary lever and having its forward end provided with two shoulders one in advance of the other, a pin on the key lever in position to engage either of said shoulders, a spring connected with the connecting bar for drawing it forward, a motor magnet arranged in a normally open circuit and arranged, when actuated, to actuate the auxiliary lever, circuit closing means for closing the motor circuit, comprising a contact frame movable into and out of the path of movement of the connecting bar, positioning means for holding the connecting bar in rearward position, and means actuated by a single lever for simultaneously moving the contact frame out of the path of the connecting bar and operating the positioning means to force the connecting bar rearward to bring its forward shoulder into position to be engaged by the pin on the key lever.

26. In a key-controlled mechanism, the combination of a key lever, an operated part, an auxiliary lever and means connecting the auxiliary lever with the operated part, a connecting bar, connected at its rear end with the auxiliary lever and having its forward end provided with two shoulders, a pin on the key lever, a spring connected to the connecting bar for drawing it forward, power mechanism arranged, when actuated, to actuate the auxiliary lever, controlling means for the power mechanism comprising a contact frame movable into and out of the path of movement of the connecting bar, means for limiting the dip of the key comprising a shoulder on the key lever and a stop bar movable into and out of the path of movement of the shoulder, and means operated by a single lever for simultaneously moving the contact frame into the path of movement of the connecting bar, and moving the stop bar into the path of movement of the shoulder on the key lever.

27. In a typewriting machine, the combination of a key lever, a typebar, an auxiliary lever, and means connecting the auxiliary lever with the typebar, a connecting bar, connected at its rear end with the auxiliary lever and having its forward end provided with two shoulders, a pin on the key lever, a spring connected to the connecting bar for drawing it forward, power mechanism arranged, when actuated, to actuate the auxiliary lever, controlling means for the power mechanism comprising a contact frame movable into and out of the path of movement of the connecting bar, means for limiting the dip of the key comprising a shoulder on the key lever and a stop bar movable into and out of the path of movement of the shoulder, and means operated by a single lever for simultaneously moving the contact frame into the path of movement of the connecting bar, and moving the stop bar into the path of movement of the shoulder on the key lever.

28. In a key-controlled mechanism, the combination of a key lever, an operated part, an auxiliary lever, and means connecting the auxiliary lever with the operated part, a connecting bar, connected at its rear end with the auxiliary lever and having its forward end provided with two shoulders, a pin on the key lever, a spring connected to the connecting bar for drawing it forward, a normally inactive motor arranged, when actuated, to actuate the auxiliary lever, means for actuating the motor comprising a contact frame movable into and out of the path of movement of the connecting bar, means for limiting the dip of the key comprising a shoulder on the key lever and a stop bar movable into and out of the path of movement of the shoulder, and means operated by a single lever for simultaneously moving the contact frame into the path of movement of the connecting bar, and moving the stop bar into the path of movement of the shoulder on the key lever.

29. In a typewriting machine, the combination of a key lever, a typebar, an auxiliary lever and means connecting the auxiliary lever with the typebar, a connecting bar, connected at its rear end with the auxiliary lever and having its forward end provided with two shoulders, a pin on the key lever, a spring connected to the connecting bar for drawing it forward, a normally inactive motor arranged, when actuated, to actuate the auxiliary lever, means for actuating the motor comprising a contact frame movable into and out of the path of movement of the connecting bar, means for limiting the dip of the key comprising a shoulder on the key lever and a stop bar movable into and out of the path of movement of the shoulder, and means operated by a single lever for simultaneously moving the contact frame into the path of movement of the connecting bar, and moving the stop bar into the path of movement of the shoulder on the key lever.

30. In a key-controlled mechanism, the combination of a key lever, an operated part, an auxiliary lever, and means connecting the auxiliary lever with the operated part, a connecting bar, connected at its rear end with the auxiliary lever and having its forward end provided with two shoulders, a pin on the key lever, a spring connected to the connecting bar for drawing it forward, a motor magnet arranged in a normally open circuit and arranged, when actuated, to actuate the auxiliary lever, means for closing the motor circuit comprising a contact frame movable into and out of the path of movement of the connecting bar, means for limiting the dip of the key comprising a shoulder on the key lever and a stop bar movable into and out of the path of movement of the shoulder, and means operated by a single lever for simultaneously moving the contact frame into the path of movement of the connecting bar, and moving the stop bar into the path of movement of the shoulder on the key lever.

31. In a typewriting machine, the combination of a key lever, a typebar, and an auxiliary lever and means connecting the auxiliary lever with the typebar, a connecting bar, connected at its rear end with the auxiliary lever and having its forward end provided with two shoulders, a pin on the key lever, a spring connected to the connecting bar for drawing it forward, a motor magnet arranged in a normally open circuit and arranged, when actuated, to actuate the auxiliary lever, means for closing the motor circuit comprising a contact frame movable into and out of the path of movement of the connecting bar, means for limiting the dip of the key comprising a shoulder on the key lever and a stop bar movable into and out of the path of movement of the shoulder, and means operated by a single lever for simultaneously moving the contact frame into the path of movement of the connecting bar, and moving the stop bar into the path of movement of the shoulder on the key lever.

32. In a key-controlled mechanism having a transversely moving carriage, the combination of an operated part, a key lever, an auxiliary lever, means connecting the auxiliary lever with the operated part, means adapted, when in position, to operatively connect the key lever and auxiliary lever, and means operated by the movement of the carriage for preventing the connecting means from operating to connect the key lever and auxiliary lever.

33. In a typewriting machine having a transversely moving carriage, the combination of a typebar, a key lever, an auxiliary lever, means connecting the auxiliary lever with the typebar, means adapted, when in position, to operatively connect the key lever and auxiliary lever, and means operated by the movement of the carriage, for so preventing the connecting means from operating to connect the key lever and auxiliary lever.

34. In a key-controlled mechanism having a transversely moving carriage, the combination with an operated part of a key lever, an auxiliary lever, means connecting the auxiliary lever with the operated part, a connecting bar movable with the key lever and adapted to operatively connect the key lever and auxiliary lever, and means operated by the movement of the carriage for preventing the connecting bar from operating to connect the key lever and auxiliary lever.

85. In a typewriting machine having a transversely moving carriage, the combination with a typebar of a key lever, an auxiliary lever, means connecting the auxiliary lever with the typebar, a connecting bar movable with the key lever and adapted to operatively connect the key lever and auxiliary lever, and means operated by the movement of the carriage for preventing the connecting bar from operating to connect the key lever and auxiliary lever.

36. In a key-controlled mechanism having a transversely moving carriage, the combination with an operated part of a key lever pivoted near its rear end, an auxiliary lever pivoted near its forward end concentrically with the key lever, means connecting the rear end of the auxiliary lever with the operated part, comprising a connecting bar having its rear end connected with the auxiliary lever and having its forward end detachably engaged with the key lever, and means operated by the movement of the carriage to prevent downward movement of the forward end of the connecting bar, so that on the depression of the key lever, the connecting bar is disconnected therefrom.

37. In a typewriting machine having a transversely moving carriage, the combination with the typebar of a key lever pivoted near its rear end, an auxiliary lever pivoted near its forward end concentrically with the key lever, means connecting the rear end of the auxiliary lever with the typebar, a connecting bar having its rear end connected with the auxiliary lever and having its forward end detachably engaged with the key lever, and means operated by the movement of the carriage to prevent downward movement of the forward end of the connecting bar, so that on the depression of the key lever, the connecting bar is disconnected therefrom.

38. In a typewriting machine having a transversely moving carriage the combination with the typebar of a key lever pivoted near its rear end, an auxiliary lever pivoted near its forward end concentrically with the key lever, means connecting the rear end of the auxiliary lever with the typebar, a connecting bar having its rear end connected with the auxiliary lever, a pin on the key lever with which the forward end of the connecting bar is adapted to be detachably engaged, and means operated by the movement of the carriage to prevent downward movement of the forward end of the connecting bar, so that on the depression of the key lever, the connecting bar is disconnected therefrom.

39. In a key operated mechanism having a transversely moving carriage the combination of an operated part, a key lever, an auxiliary lever movable independently of the key lever, means connecting the auxiliary lever with the operated part, means for returning the auxiliary lever and operated part to normal position, a connecting bar connected at its rear end with the auxiliary lever and having its forward end detachably connected with the key lever and arranged to move therewith as the key is depressed and to transmit the movement of the key lever to the auxiliary lever, a stop movable into and out of position to prevent the depression of the connecting bar, and to thus prevent the movement of the key lever from being transmitted to the auxiliary lever, and means operated by the carriage for moving the stop into operative position.

40. In a typewriting machine having a transversely moving carriage, the combination of a typebar, a key lever, an auxiliary lever movable independently of the key lever, means connecting the auxiliary lever with the typebar, means for returning the auxiliary lever and typebar to normal position, a connecting bar connected at its rear end with the auxiliary lever and having its forward end detachably connected with the key lever and arranged to move therewith as the key is depressed and to transmit the movement of the key lever to the auxiliary lever, a stop movable into and out of position to prevent the depression of the connecting bar, and to thus prevent the movement of the key lever from being transmitted to the auxiliary lever, and means operated by the carriage for moving the stop into operative position.

41. In a key-controlled mechanism, the combination of an operated part, a key lever, an auxiliary lever movable independently of the key lever, means connecting the auxiliary lever with the operated part, means for returning the auxiliary lever and operated part to normal position, a connecting bar connected at its rear end with the auxiliary lever and having its forward end detachably connected with the key lever and arranged to move therewith as the key is depressed and to transmit the movement of detachably connected with the key lever and stop arranged in the path of movement of the connecting bar adapted to raise its forward end and thus free it from engagement with the key lever to permit the auxiliary lever and typebar to return to normal position independently of the key lever.

42. In a typewriting machine the combination of a typebar, a key lever, an auxiliary lever movable independently of the key lever, means connecting the auxiliary lever with the typebar, means for returning the auxiliary lever and typebar to normal position, a connecting bar connected at its rear end with the auxiliary lever and having its forward end detachably connected with the key lever and arranged to move therewith as the key is depressed and to transmit the movement of the key lever to the auxiliary lever, and a stop arranged in the path of movement of the connecting bar adapted to raise its forward end and thus free it from engagement with the key lever to permit the auxiliary lever and typebar to return to normal position independently of the key lever.

43. In a key-controlled mechanism the combination of an operated part, a key lever, an auxiliary lever movable independently of the operated part, means connecting the auxiliary lever with the operated part, means for returning the auxiliary lever and operated part to normal position, a connecting bar connected at its rear end with the auxiliary lever and having its forward end detachably connected with the key lever and arranged to move therewith as the key is depressed and to transmit the movement of the key lever to the auxiliary lever, and a yielding stop arranged in the path of movement of the connecting bar adapted to lift the connecting bar and thus free its forward end from engagement with the key lever to permit the auxiliary lever and typebar to return to normal position independently of the key lever.

44. In a typewriting machine the combination of a typebar, a key lever, an auxiliary lever movable independently of the key lever, means connecting the auxiliary lever with the typebar, means for returning the auxiliary lever and typebar to normal position, a connecting bar connected at its rear end with the auxiliary lever and having its forward end detachably connected with the key lever and arranged to move therewith as the key is depressed and to transmit the movement of the key lever to the auxiliary lever, and a yielding stop arranged in the path of movement of the connecting bar adapted to lift the connecting bar and thus free its forward end from engagement with the key lever to permit the auxiliary lever and typebar to return to normal position independently of the key lever.

45. In a key-controlled mechanism, the combination of a pivoted key lever, an operated part movable independently of the movement of the key lever, a normally inactive motor, means controlled by the key lever for causing the motor to be actuated, an auxiliary lever pivoted concentrically with the key lever movable from its normal position of rest independently of the movement of the key lever and operated by the motor for actuating the operated part, and means for actuating the operated part directly by the key lever.

46. In a typewriting machine, the combination of a key, and a type bar arranged to have a thrust or rectilinear movement, a normally inactive motor, means controlled by the key for causing the motor to be actuated, means movable independently of the movement of the key, operated by the motor, for actuating the type bar, and means for actuating the type bar directly by the key.

47. In a key controlled mechanism, the combination of a key, and an operated part arranged to have a thrust or rectilinear movement, a normally inactive motor comprising a fixed and a reciprocating part, means controlled by the key for causing the motor to be actuated to effect movement of the reciprocating part, means movable independently of the movement of the key and operated by the motor for actuating the operated part, and means for actuating the operated part directly by the key.

48. In a typewriting machine, the combination of a key, and a type bar arranged to have a thrust or rectilinear movement, a normally inactive motor comprising a fixed and a reciprocating part, means controlled by the key for causing the motor to be actuated to effect movement of the reciprocating part, means movable independently of the movement of the key, operated by the motor, for actuating the type bar, and means for actuating the type bar directly by the key.

49. In a key controlled mechanism, the combination of a key carried by a pivoted key lever and an operated part arranged to have a thrust or rectilinear movement, a lever pivoted concentrically with the key lever and connected with the operated part for actuating the same, a normally inactive motor, means controlled by the key for causing the motor to be actuated, means movable independently of the movement of the key and operated by the motor for operating the lever to actuate the operated part, and means for operating the lever directly by the key.

50. In a typewriting machine, the combination of a key carried by a key lever, and a type bar arranged to have a thrust or rectilinear movement, a lever pivoted concentrically with the key lever and connected with the type bar for actuating the same, a normally inactive motor, means controlled by the key, for causing the motor to be actuated, means movable independently of the movement of the key, operated by the motor, for operating the lever to actuate the type bar, and means for operating the lever directly by the key.

51. In a key controlled mechanism, the combination of a key, and an operated part arranged to have a thrust or rectilinear movement, a lever connected with the operated part for actuating the same, a normally inactive motor, means controlled by the key for causing the motor to be actuated, means movable independently of the movement of the key, operated by the motor, for operating the lever to actuate the operated part, means for limiting the movement of the key when the motor controlling means is connected therewith, means for disconnecting the motor controlling means from the key, and means for actuating the operated part directly by the key.

52. In a typewriting machine, the combination of a key, and a type bar arranged to have a thrust or rectilinear movement, a normally inactive motor, means normally controlled by the key, for causing the motor to be actuated, means movable independently of the movement of the key, operated by the motor, for actuating the type bar, means for limiting the movement of the key, when the motor controlling means is connected therewith, means for disconnecting the motor controlling means from the key and means for actuating the operated part directly by the key.

53. In a typewriting or other machine, the combination of a key, a pivoted key lever, an operated part arranged to have a thrust or rectilinear movement, an auxiliary lever pivoted at one end concentrically with the key lever, and having its other end operatively connected with the operated part, a power mechanism arranged to actuate the auxiliary lever, means arranged to be acted upon by the key lever for controlling the power mechanism, said means comprising a connecting bar connected with the supplemental lever, and adapted to operatively connect the free ends of the key lever and auxiliary lever when the power mechanism is disconnected.

54. In a typewriting or other machine, the combination with an operated part having a thrust or rectilinear movement, of a key lever, an auxiliary lever operatively connected with said operated part for actuating the same, electrically operated power mechanism controlled by the key lever, means for actuating the auxiliary lever on the depression of the key, said means comprising a link secured to the auxiliary lever, and a connecting bar carried by the link, adapted to co-act with the key lever.

55. In a typewriting or other machine, the combination with an operated part having a thrust or rectilinear movement, of a key lever, an auxiliary lever operatively connected with said operated part for actuating the same, electrically operated power mechanism controlled by the key lever, means for actuating the auxiliary lever on the depression of the key, said means comprising a link secured to the auxiliary lever, and a connecting bar carried by the link adapted to co-act with the key lever, said link and connecting bar being adjustable to provide a direct connection between the key lever and the auxiliary lever.

56. In a typewriting or other machine, the combination of an operated part having a thrust or rectilinear movement, of a key lever, an auxiliary lever operatively connected with said operated part for actuating the same, an electrically operated power mechanism controlled by the key lever, means for actuating the auxiliary lever on the depression of the key, said means comprising a link secured to the auxiliary lever, and a connecting bar carried by the link arranged to co-act with the key lever, said link and connecting bar being adapted to serve as a rigid coupling between the key lever and auxiliary lever.

57. In a typewriting or other machine, the combination of a key lever, an operated part having a thrust or rectilinear movement, an auxiliary lever operatively connected with the operated part, power mechanism arranged to actuate the auxiliary lever, means for controlling said power mechanism, and a connecting bar connected with the auxiliary lever and adapted to serve both to operate the controlling means for the power mechanism and also as a mechanical connection between the key lever and auxiliary lever, said connecting bar being provided with a shoulder for engagement with the key lever when it is arranged to operate the controlling means and also provided with a second shoulder for engagement with the key lever when it is arranged to mechanically connect the key lever and auxiliary lever.

58. In a typewriting or other machine, the combination of a key lever, an operated part having a thrust or rectilinear movement, an auxiliary lever operatively connected with the operated part, an electrically operated power mechanism arranged in a normally open circuit, a connecting bar connected with the auxiliary lever and arranged to be engaged by the key lever, a circuit closer and means for operating said circuit closer to close the circuit through the power mechanism, said means for operating the circuit closer being normally located in the path of movement of the connecting bar, and means for shifting said means out of the path of the connecting bar.

59. In a typewriting or other machine, the combination of an operated part having a thrust or rectilinear movement, a pivoted key lever, an auxiliary lever pivoted concentrically with the key lever and operatively connected with said operated part, electrically operated means for actuating said auxiliary lever, comprising a motor arranged in a normally open circuit, a motor frame, a link connected with the auxiliary lever and adapted to be positioned in the path of the motor frame, and means arranged to be operated by the key for positioning said link in the path of the motor frame and for closing the circuit through said motor.

60. In a typewriting or other machine, the combination of an operated part having a thrust or rectilinear movement, a pivoted key lever, an auxiliary lever pivoted concentrically with the key lever and operatively connected with said operated part, electrically operated means for actuating said auxiliary lever comprising a motor arranged in a normally open circuit, a motor frame, a link connected with the auxiliary lever and adapted to be positioned in the path of the motor frame, a contact frame adapted to close the circuit through the motor, and means arranged to be operated by the key for positioning the link and for actuating the contact frame to close the circuit.

61. In a typewriting or other machine, the combination of an operated part having a thrust or rectilinear movement, a pivoted key lever, an auxiliary lever pivoted concentrically with the key lever and operatively connected with said operated part, electrically operated means for actuating said auxiliary lever, comprising a motor arranged in a normally open circuit, a motor frame, a link connected with the auxiliary lever, and adapted to be positioned in the path of the motor frame, a contact frame adapted to close the circuit through the motor and means arranged to be operated by the key for positioning the link and for actuating the contact frame to close the circuit, comprising a connecting bar, connected to the link and having a shoulder arranged to engage the contact frame.

62. In a typewriting or other machine, the combination of an operated part having a thrust or rectilinear movement, a key lever, an auxiliary lever operatively connected with said operated part, electrically operated means for actuating said auxiliary lever, comprising a motor arranged in a normally open circuit, a motor frame, a link connected with the auxiliary lever, and adapted to be positioned in the path of the motor frame, a contact frame adapted to close the circuit through the motor, and means arranged to be operated by the key for positioning the link and for actuating the contact frame to close the circuit comprising a connecting bar connected to the link and having a shoulder arranged to engage the contact frame, said connecting bar being also adapted to mechanically connect the key lever and auxiliary lever, and means for shifting the contact frame out of engagement with the connecting bar.

63. In a typewriting or other machine, the combination with an operated part, a key lever, an auxiliary lever operatively connected with the operated part, an electrical means for actuating the auxiliary lever comprising a motor arranged in a normally open circuit, a motor frame, a link connected to the auxiliary lever and adapted to be positioned in the path of the motor frame, a contact frame adapted to close said circuit, a connecting bar pivotally connected to said link, having a shoulder for engaging the contact frame, and having its free end arranged in the path of the key lever, whereby said connecting bar is shifted when the key lever is depressed, to position the link in the path of the motor frame and to shift said contact frame to close said circuit, whereby said motor will be energized and actuate said motor frame to strike said link, lift the auxiliary lever and said connecting bar, thereby freeing said contact frame, and means for returning the latter when freed, whereby the same will lift the free end of the connecting bar and release the same from the key lever.

64. In a typewriting or other machine, an operated part, a key lever, an auxiliary lever, operatively connected with the operated part, an electrically operated mechanism arranged to actuate the auxiliary lever, comprising a motor arranged in a normally open circuit, a motor frame, a fixed contact, and a contact frame carrying a movable contact, a link secured to the auxiliary lever and adapted to be positioned in the path of movement of the motor frame, a connecting bar carried by the link, arranged to be engaged by the key lever, when the latter is depressed, to position said link, and a detachable connection between the connecting bar and said contact frame for connecting the latter to close said circuit as said link is positioned.

65. In a typewriting or other machine, an operated part, a key lever, an auxiliary lever operatively connected with the operated part, an electrically operated mechanism arranged to operate the auxiliary lever, comprising a motor arranged in a normally open circuit, a motor frame, a fixed contact and a contact frame having a movable contact connected therewith, a link secured to the auxiliary lever, a connecting bar carried by the link, arranged to be engaged by the key lever when the latter is depressed, to position said link, means for holding the link normally out of the path of the motor frame and holding the connecting bar in position to be engaged by the key lever, and a shoulder on said connecting bar arranged to operate the contact frame to close the circuit as said link is positioned.

66. In a typewriting or other machine, a key lever, an operated part, an auxiliary lever operatively connected to the operated part, an electrically operated mechanism arranged to actuate the auxiliary lever, comprising a motor, arranged in a normally open circuit, a motor frame, a fixed contact, and a contact frame having a cross bar and carrying a movable contact, a link secured to the auxiliary lever, a connecting bar carried by the link arranged to be engaged by the key lever when the latter is depressed, to position said link, means for holding the link normally out of the path of the motor frame and holding the connecting bar in position to engage the key lever, said connecting bar having a shoulder on the under side thereof, arranged to engage the cross bar of said contact frame, to operate the latter as said connecting bar is shifted.

67. In a typewriting or other machine, a key lever, an operated part, an auxiliary lever operatively connected to the operated part, an electrically operated mechanism interposed between the same and said first named lever, comprising a normally open circuit, including a motor, a fixed contact, and a universal contact frame having a movable contact connected therewith, a link secured to the auxiliary lever, a connecting bar carried by the link co-acting with the key lever when the latter is depressed to position said link, means tending to hold the link out of the path of the motor frame and the connecting bar in position to engage the key lever, and a connection between said connecting bar and contact frame for operating the latter to close the circuit as said connecting bar is shifted, whereby said circuit will be closed and the motor frame actuated to strike and lift said positioned link, said positioned link being elevated a sufficient distance to release said connecting bar from the contact frame, and means for returning the contact frame to position, said frame being arranged in its return to lift the free end of said connecting bar to disengage the same from the key lever.

68. In a typewriting or other machine, a type bar, a pivoted lever, means between the same and said type bar for actuating the type bar as said lever is operated, a key, a key lever pivoted concentrically with the lever, a link secured to the first named lever, a connecting bar therefor having a detachable engagement with said key lever, an electrically operated mechanism for lifting said link, including means operated by said connecting bar when the key lever is depressed to actuate said electrical mechanism, whereby the same will disengage said connecting bar from the key lever to permit said key lever and type bar to return to their initial positions independently of each other.

69. In a typewriting or other machine, a type bar, a lever, means interposed between the same and the type bar for actuating the type bar, a key, a key lever, a link secured to the first named lever, electrically operated mechanism for actuating the same, including a contact frame and a connecting bar for positioning said link and operating the contact frame, said connecting bar having two engaging parts arranged one in advance of the other, designed to engage said key lever, said key lever, link, and connecting bar having movement independent of the first named lever, when one of said parts is in engagement with the key lever, and being prevented from partaking of an independent movement when the other part is in engagement with said lever.

70. In a typewriting or other machine, a type bar, a lever, means interposed between the same and the type bar for actuating the type bar, a key, a key lever, a link secured to the first named lever, electrically operated mechanism for actuating the same, including a contact frame, and a connecting bar for positioning said link and operating the contact frame, said connecting bar having two engaging parts designed to engage the said key lever, said key lever, link and connecting bar having movement independent of the first named lever when one of said parts is in engagement with the key lever and being prevented from partaking of an independent movement when the other part is in engagement with said lever.

71. In a typewriting or other machine, and in combination, a type bar, a lever, means interposed between the same and the type bar for operating said type bar as the lever is operated, a key, a key lever extending at an angle to the first named lever, a connecting bar adapted to be positioned to form a strut between said levers, whereby the first named lever will be operated directly from the key lever, and electrically operated mechanism for actuating said first named lever, said connecting bar being adapted to be shifted to have movement independent of the first named lever upon the depression of the key lever, said device setting in action the electrically operated mechanism in the independent movement thereof.

72. In a typewriting or other machine and in combination, a type bar, a lever, means interposed between the same and the type bar for operating said type bar as the lever is operated, a key, a key lever extending at an angle to the first named lever, mechanism for operating the first named lever by power auxiliary to that employed in depressing the key, a device for setting said mechanism in operation on the depression of a key, and means for shifting said device into a position to provide a rigid connection strut between said levers.

73. In a typewriting machine, the combination of a platen, a printing device having a thrust or rectilinear movement and movable from its normal position of rest independently of the movement of the key lever, a key lever, a source of power, operative connections between the source of power and the printing device controlled by the key lever, and means operated through a part of said connections for operating the printing device from the key lever independently of the source of power.

74. In a key-controlled mechanism, the combination of a key, an operated part arranged to have a thrust or rectilinear movement, and movable independently of the key, a motor, means controlled by the key for causing the motor to be actuated, means movable from its normal position of rest by the motor for actuating the operated part and means thereupon automatically acting to cause the motor to become again inactive, after once operating the actuating parts, and while the key remains depressed.

75. In a key-controlled mechanism, the combination of a key, an operated part arranged to have a thrust or rectilinear movement, a normally inactive motor, means controlled by the key for causing the motor to be actuated, means movable independently of the movement of the key and operated by the motor for actuating the operated part, and means thereupon acting for rendering the said motor again inactive after having once actuated the operated part.

In testimony whereof I affix my signature, in presence of two witnesses.

JOHN T. SCHAAFF.

Witnesses:
E. H. PARKINS,
A. P. GREELEY.

---

Correction in Letters Patent No. 1,040,585.

It is hereby certified that in Letters Patent No. 1,040,585, granted October 8, 1912, upon the application of John T. Schaaff, of Washington, District of Columbia, for an improvement in "Type-Writing and Other Key-Actuated Machines," an error appears in the printed specification requiring correction as follows: Page 3, line 80, strike out the words and syllable "movement of the key-lever when the ma-" and insert the words *necessary to effect the operation of the type-;* and that the said Letters Patent should be read with this correction therein that the same may conform to the record of the case in the Patent Office.

Signed and sealed this 26th day of November, A. D., 1912.

[SEAL.]

C. C. BILLINGS,
*Acting Commissioner of Patents.* able from its normal position of rest independently of the movement of the key lever, a key lever, a source of power, operative connections between the source of power and the printing device controlled by the key lever, and means operated through a part of said connections for operating the printing device from the key lever independently of the source of power.

74. In a key-controlled mechanism, the combination of a key, an operated part arranged to have a thrust or rectilinear movement, and movable independently of the key, a motor, means controlled by the key for causing the motor to be actuated, means movable from its normal position of rest by the motor for actuating the operated part and means thereupon automatically acting to cause the motor to become again inactive, after once operating the actuating parts, and while the key remains depressed.

75. In a key-controlled mechanism, the combination of a key, an operated part arranged to have a thrust or rectilinear movement, a normally inactive motor, means controlled by the key for causing the motor to be actuated, means movable independently of the movement of the key and operated by the motor for actuating the operated part, and means thereupon acting for rendering the said motor again inactive after having once actuated the operated part.

In testimony whereof I affix my signature, in presence of two witnesses.

JOHN T. SCHAAFF.

Witnesses:
E. H. PARKINS,
A. P. GREELEY.

---

Correction in Letters Patent No. 1,040,585.

It is hereby certified that in Letters Patent No. 1,040,585, granted October 8, 1912, upon the application of John T. Schaaff, of Washington, District of Columbia, for an improvement in "Type-Writing and Other Key-Actuated Machines," an error appears in the printed specification requiring correction as follows: Page 3, line 80, strike out the words and syllable "movement of the key-lever when the ma-" and insert the words *necessary to effect the operation of the type-;* and that the said Letters Patent should be read with this correction therein that the same may conform to the record of the case in the Patent Office.

Signed and sealed this 26th day of November, A. D., 1912.

[SEAL.]

C. C. BILLINGS,
*Acting Commissioner of Patents.*

It is hereby certified that in Letters Patent No. 1,040,585, granted October 8, 1912, upon the application of John T. Schaaff, of Washington, District of Columbia, for an improvement in "Type-Writing and Other Key-Actuated Machines," an error appears in the printed specification requiring correction as follows: Page 3, line 80, strike out the words and syllable "movement of the key-lever when the ma-" and insert the words *necessary to effect the operation of the type-;* and that the said Letters Patent should be read with this correction therein that the same may conform to the record of the case in the Patent Office.

Signed and sealed this 26th day of November, A. D., 1912.

[SEAL.]

C. C. BILLINGS,
*Acting Commissioner of Patents.*